United States Patent [19]

Hessbrüggen

[11] Patent Number: 4,616,538

[45] Date of Patent: Oct. 14, 1986

[54] CHUCK ASSEMBLY

[75] Inventor: Norbert Hessbrüggen, Salach, Fed. Rep. of Germany

[73] Assignee: UMA Corporation, Houston, Tex.

[21] Appl. No.: 604,921

[22] Filed: Apr. 27, 1984

[51] Int. Cl.⁴ .............................................. B23B 31/00
[52] U.S. Cl. ................................... 82/40 R; 279/4; 279/121; 279/123
[58] Field of Search ............... 279/121, 123, 4 R; 82/40 R

[56] References Cited

U.S. PATENT DOCUMENTS

| 1,412,170 | 4/1922 | Dixon | 279/1 P |
| 1,906,424 | 5/1933 | Schurr | 279/60 |
| 3,076,662 | 2/1963 | Kostyrka | 82/40 R |
| 3,684,304 | 8/1972 | Dexter | 279/1 J |
| 4,044,638 | 8/1977 | Heffron | 82/40 R |
| 4,121,848 | 10/1978 | Morawski | 279/121 |
| 4,482,162 | 11/1984 | Anegawa | 279/1 J |

Primary Examiner—Francis S. Husar
Assistant Examiner—Jerry Kearns
Attorney, Agent, or Firm—Browning, Bushman, Zamecki & Anderson

[57] ABSTRACT

An improved chuck assembly for a lathe comprises a housing member serving as a base, first holding means movably connected to the base for selectively radially gripping the side surface of a workpiece, and second holding means connected to the base for axially engaging an end surface of such workpiece. The second holding means is located generally centrally of the first holding means, the first holding means being movable both radially and longitudinally to clear the end of the workpiece without removal of the chuck.

35 Claims, 14 Drawing Figures

CHUCK ASSEMBLY

BACKGROUND OF THE INVENTION

The present invention pertains to lathes, and more particularly to chucks and other holding assemblies which can be installed on a lathe to hold a workpiece. A typical chuck comprises a plurality of circumferentially spaced jaws which can be moved radially inwardly and outwardly to grip a workpiece, such as a shaft, by its side surfaces. Other types of holding assemblies are known. For example, some assemblies include face-driver or stab-type formations which frictionally engage the axially facing end of a workpiece. These formations may be sharp chisel points which "bite into" the end of the workpiece, or they may be adapted to mate with pre-formed depressions in the end of the workpiece. In any event, either the chuck or the stab-type assembly may be installed interchangeably on the headstock of the lathe.

Several problems are associated with the use of such conventional holding assemblies. These may be illustrated by describing the process of turning the outer diameter, hereafter "O.D.," of a shaft to a desired finished dimension. There are several ways of accomplishing this using conventional tools of the types described above, but none are entirely satisfactory.

In one typical procedure, a chuck is installed in the lathe, and a workpiece is held near one end by the chuck while the portion of the workpiece adjacent its opposite end is rough cut to near finished diameter. It is not possible to advance the cutting tool along the entire length of the workpiece while one end thereof is held in the chuck. Thus, the workpiece must be removed and reversed in the lathe so that the chuck holds the workpiece by that end which has already been rough cut while the other end (original holding end) is cut.

Next, a fine finishing cut is made, with a different cutting tool, to smoothly finish the O.D. of the workpiece and reduce it to the desired final dimension. Again, because the cutting tool cannot move past the chuck jaws, the finishing cut must be made in two sections, one beginning from each end of the workpiece, the workpiece being reversed in the lathe after the first section is cut. This can leave scar, step or slight offsetting of diameter at the juncture of the two sections, and this is undesirable, or even unacceptable, for some applications.

Accordingly, another common procedure is to cut the original workpiece longer than the desired finished shaft length, finish the O.D. in a single pass stopping short of the chuck, and then remove and discard the end of the workpiece which was held by the chuck during the finishing cut. This alternative method is time-consuming and wasteful.

Any attempt to perform an entire cut in a single pass with the chuck removed and the workpiece held only by a face-driver or stab-type holding assembly would probably be unsuccessful, or at least unreliable, in many instances, especially when the cutting tool is working distal the headstock, due to high torque.

Still other problems revolve around the fact that conventional chucks and stab-type holders are completely separate and distinct assemblies which must be interchanged on the lathe. Obviously, this results in delays and inconvenience.

SUMMARY OF THE INVENTION

The present invention combines in a single chuck assembly first holding means, such as chuck jaws, for radially gripping the side surfaces of a workpiece, and a second holding means, such as a face-driver or stab-type assembly, for axially engaging the end surface of the workpiece.

A salient feature of the invention involves the adaptation of the chuck assembly to provide selective movement of the two holding means independently of each other. In preferred embodiments, the second holding means is located generally centrally of the first holding means, and the independent movement is provided by respective piston and cylinder actuator assemblies. These actuator assemblies may be at least partially concentric, and have concentric force transmission members which pass through the headstock spindle to their respective holding means.

To clear the holding end of the workpiece for engagement by a cutting tool, the first gripping means or chuck jaws are movable both radially and longitudinally. These movements are preferably caused sequentially, e.g. radial retraction followed by longitudinal retraction, by a single stroke of the respective actuator piston via suitable linking means.

Thus, for example, using the improved chuck assembly of the present invention, a workpiece may be placed in the improved chuck assembly, one end radially gripped by the chuck jaws, and rough cut to a point near the holding end which is held by the chuck jaws.

Next, without removing either the workpiece or the chuck assembly, and with the chuck jaws still gripping the holding end of the workpiece, the finishing cut is begun at the tail end of the workpiece, continued to a point just short of the chuck jaws, and temporarily stopped. Without removing either workpiece or chuck assembly, the second or stab-type holding means is actuated to engage the axially-facing end surface of the holding end of the workpiece, the chuck jaws are radially and longitudinally retracted, and the holding end is rough cut and finished.

Alternatively, with the chuck jaws advanced and engaged with the holding end of the workpiece, the rough cut could be made to a point near the jaws, the jaws retracted, the second holding means engaged, and the rough cut continued along the holding end. Then, the chuck jaws could be re-engaged, the second holding means disengaged, and the same procedure repeated for the finishing cut.

In either case, the work is finished without ever removing and reversing the workpieces or replacing the holding means on the lathe. The job is done with a minimum of time and trouble, and without any irregularity in the O.D. nor waste of the holding end.

It is therefore one object of the present invention to provide a single, improved chuck assembly with both radial and axial holding means.

Another object of the invention is to provide an improved chuck assembly in which radial gripping jaws are both radially and longitudinally movable.

A further object of the invention is to provide such a chuck assembly in which such radial and longitudinal movements of radial gripping jaws are caused by a single stroke of an axial drive means.

Still another object of the invention is to provide selective independent actuation of radial and axial holding means.

Still other objects, features and advantages of the present invention will be made apparent by the following detailed description, the drawings and the claims.

DETAILED DESCRIPTION

Figure 1:
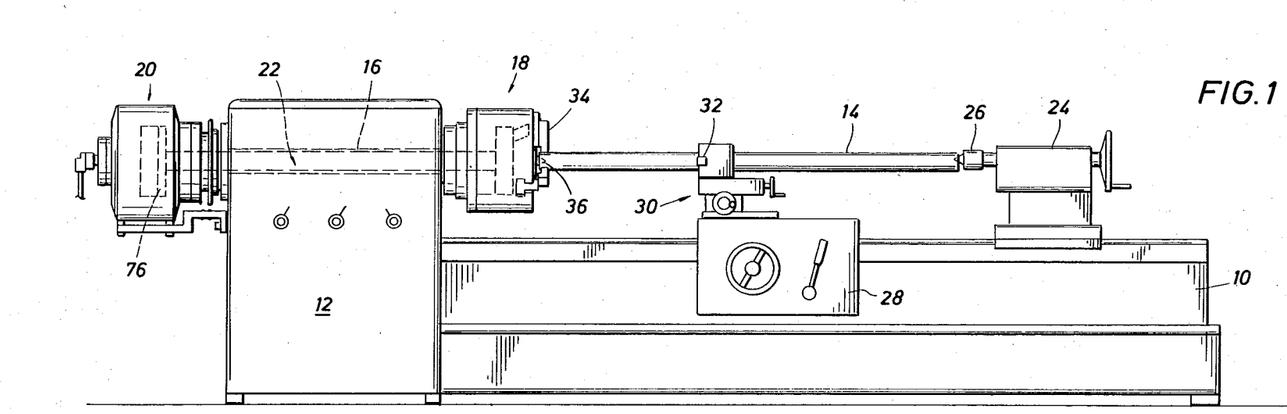
FIG. 1 is a longitudinal elevational view of a lathe with a chuck assembly according to the present invention installed thereon and the chuck jaws fully advanced gripping the workpiece.

Referring first to FIG. 1, there is shown a lathe apparatus comprising an elongate main body 10 which may provide guide railings for other parts of the lathe, house a lubricant container, etc., all as well known in the art. At one end, hereafter the "head end" of main body 10 is a conventional headstock 12, also well known in the art. The headstock 12 is adapted to alternatively mount a number of different assemblies for controlling or handling various workpieces, an example of which is shown at 14. As used herein, terms such as "longitudinal," "radial," "axial," and "circumferential" will have reference to the locus of the workpiece centerline, unless otherwise noted.

The headstock 12 has a generally tubular spindle 16 extending longitudinally therethrough. Spindle 16 is adapted to receive parts of the various workpiece-handling assemblies referred to above and may be rotated by conventional drive means in the headstock 12. As shown, the headstock 12 is equipped with an improved chuck assembly according to the invention. The improved chuck assembly comprises a working portion 18 disposed at the axially inner end of headstock 12, an actuating portion 20 disposed at the axially outer end of headstock 12, and force-transmission means 22 extending through spindle 16 to join the actuating and working portions.

The lathe further comprises a tailstock 24 adjustably mounted on body 10 for positioning at any desired point along the length of body 10. Whereas the working portion 18 of the chuck assembly supports the head end of workpiece 14 by means described below, tailstock 24 supports the tail end of workpiece 14 by means of a "live" or rotatable idler center 26. Center 26 has a conical projection extending axially inwardly for receipt in a pre-formed recess in the end surface of the workpiece, as is well known in the art.

The lathe further comprises an apron 28 which is mounted for longitudinal movement along body 10 on suitable guide rails. A cutting tool 32, for machining the workpiece 14, is ultimately carried by apron 28 by means of several intervening carriage assemblies 30, which allow the orientation of tool 32 to be changed as needed.

The working portion 18 of the improved chuck assembly includes two different means for holding the head end of workpiece 14: a first chuck-type holding means comprising jaws 34 for radially gripping the side surface of workpiece 14, and a second face-driver or stab-type holding means 36 for axially engaging the end surface of workpiece 14.

Figure 2:
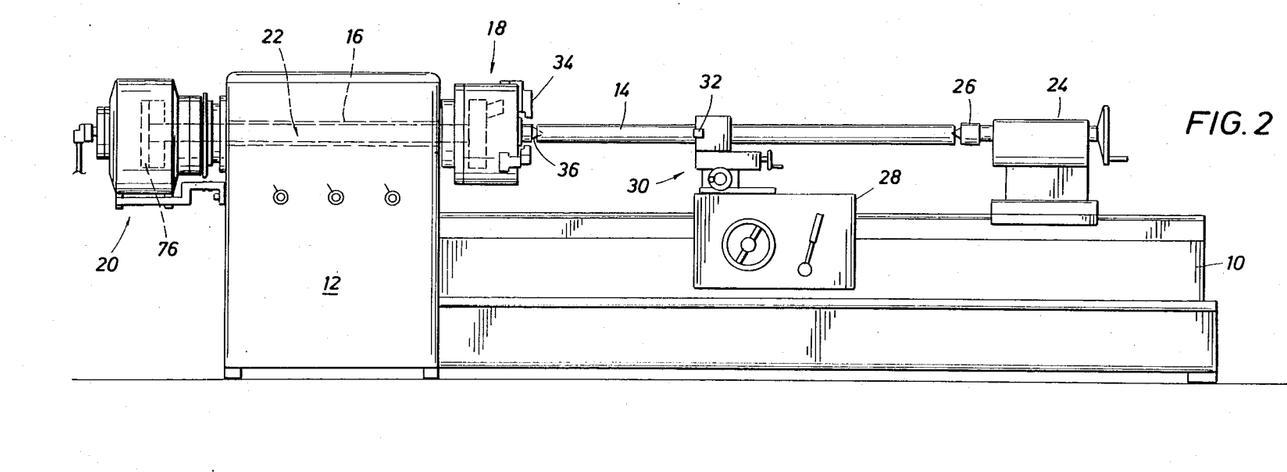
FIG. 2 is a view similar to FIG. 1 with the chuck jaws radially and longitudinally retracted.

The two holding means can be selectively moved, independently of each other, by respective actuator mechanisms located in the actuating portion 20. More specifically, the chuck jaws 34 can be extended and retracted, not only radially, but also longitudinally. FIG. 1 shows the jaws fully extended, radially and longitudinally inwardly, to grip workpiece 14. FIG. 2 shows jaws 34 fully retracted, radially and longitudinally outwardly, to clear the end of the workpiece.

Referring now to FIGS. 3, 6–9, 13 and 14, the working portion 18 of the chuck assembly will be described in greater detail. At the outset, it is helpful to note that the entire working portion 18 rotates with spindle 16 during machining operations.

Figure 3:
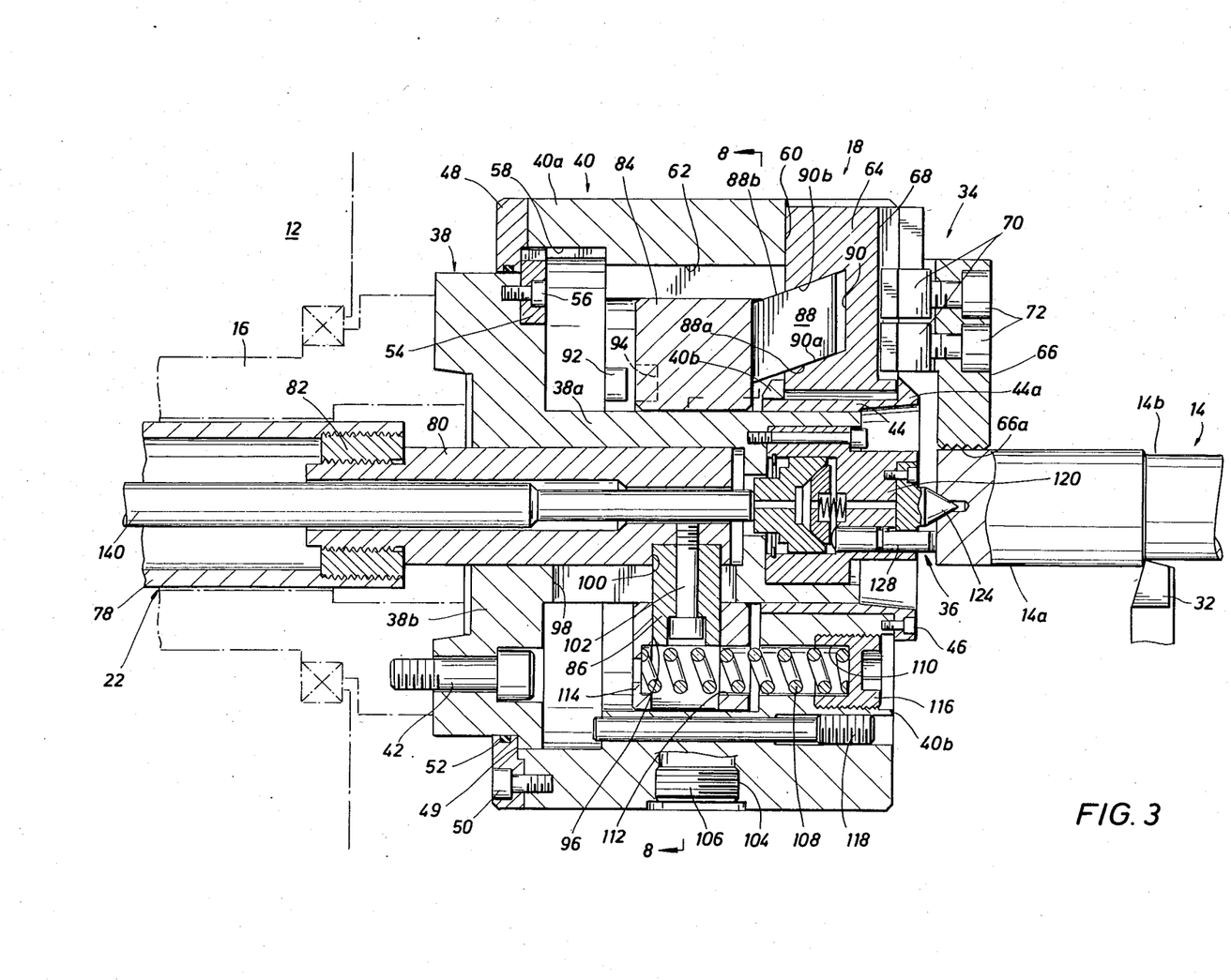
FIG. 3 is a longitudinal sectional view of the working end of the improved chuck assembly with the chuck jaws fully advanced.

Working portion 18 has a housing comprising two major parts: a base structure or part 38, which does not move longitudinally in use, and a moving par 40, which is mounted for longitudinal sliding movement on base part 38.

The base part 38 of the housing includes a longitudinally extending sleeve 38a with an integral annular flange 38b extending radially outwardly from the axially outer extremity of sleeve 38a. Flange 38b is connected to spindle 16 for joint rotation by a plurality of bolts, one of which is shown at 42.

The moving part 40 of the housing comprises a longitudinally extending sleeve 40a, dimensioned to lie radially outwardly of both sleeve 38a and flange 38b of housing base part 38, and an integral annular flange 40b extending radially inwardly from the axially inner extremity of sleeve 40a. During manufacture of housing part 40, a number of raceways and other formations, described more fully below, are formed in flange 40b. Then, a sleeve 44 is inserted to close the inner diameter of flange 40b. Sleeve 44 has a small annular flange 44a extending radially outwardly to overlie the exterior end face of flange 40b and secured thereto by screws 46 so that sleeve 44 is integrated with and forms a part of flange 40b.

Near flange 44a, sleeve 44 has its inner diameter tapered radially outwardly and axially inwardly to help ensure that machine cuttings are thrown outwardly by centrifugal force. The remainder of the inner diameter of sleeve 44 has a sliding fit on the outer diameter of sleeve 38a. A bearing ring 48 is attached to the axially outer end face of sleeve 40a by screws 50 to form a part of sleeve 40a. Ring 48 extends inwardly for a sliding fit on the O.D. flange 38b and is sealed thereto by O-ring 52. Thus, the housing defines a first annular, variable volume chamber between sleeves 38a and 40a, and a second chamber internally of sleeve 38a. A key member 54 secured to flange 38b by screw 56 extends into a keyway 58 in the I.D. of sleeve 40a to prevent relative rotation of housing parts 38 and 40.

Figure 13:
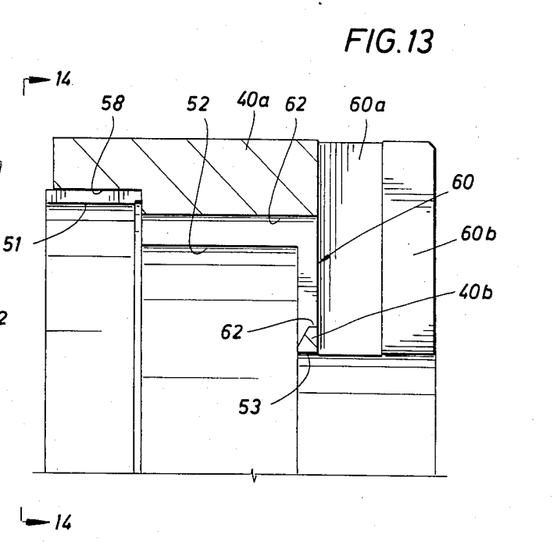
FIG. 13 is a detailed sectional view taken of the movable part of the housing, with other parts removed, in the plane of FIG. 3.
Figure 14:
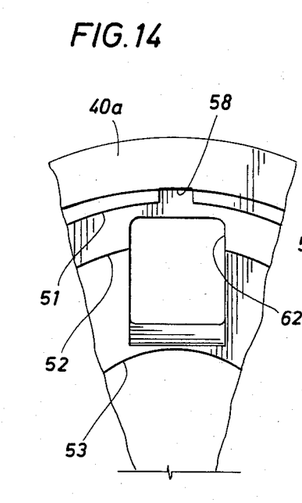
FIG. 14 is a detailed view taken on the line 14—14 of Fig. 13.

The precise configuration of moving housing part 40 is best understood by comparison of FIGS. 3, 6, 7, 13 and 14. Part 40 is bored and counterbored to provide successive sections of varying I.D. As shown in FIGS. 13 and 14, a section 51 along the axially outermost part of sleeve 40a has the largest I.D. Section 52 along the axially innermost part of sleeve 40a has a somewhat smaller I.D. Section 53 along flange 40b has a much smaller I.D.

Figure 6:
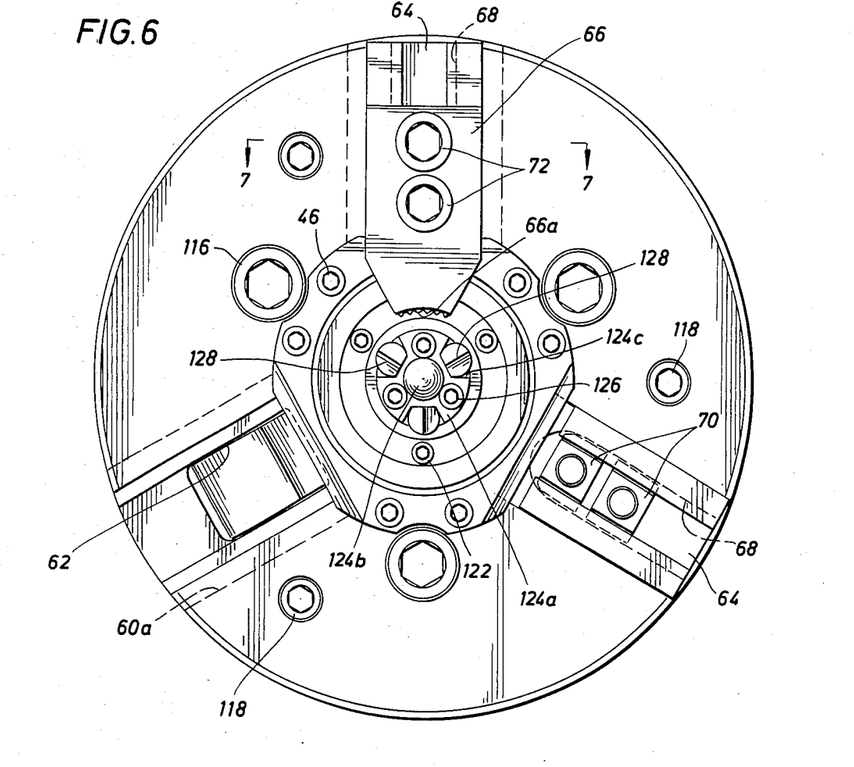
FIG. 6 is a transverse view taken on the line 6—6 of FIG. 3, with parts broken away.
Figure 7:
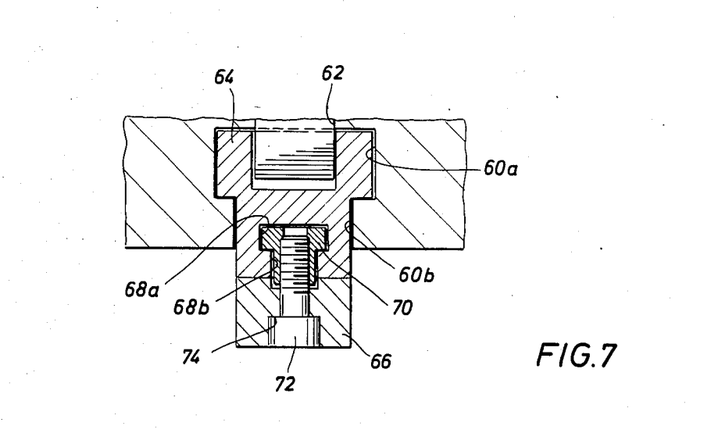
FIG. 7 is a detailed sectional view taken on the line 7—7 of FIG. 6.
Figure 8:
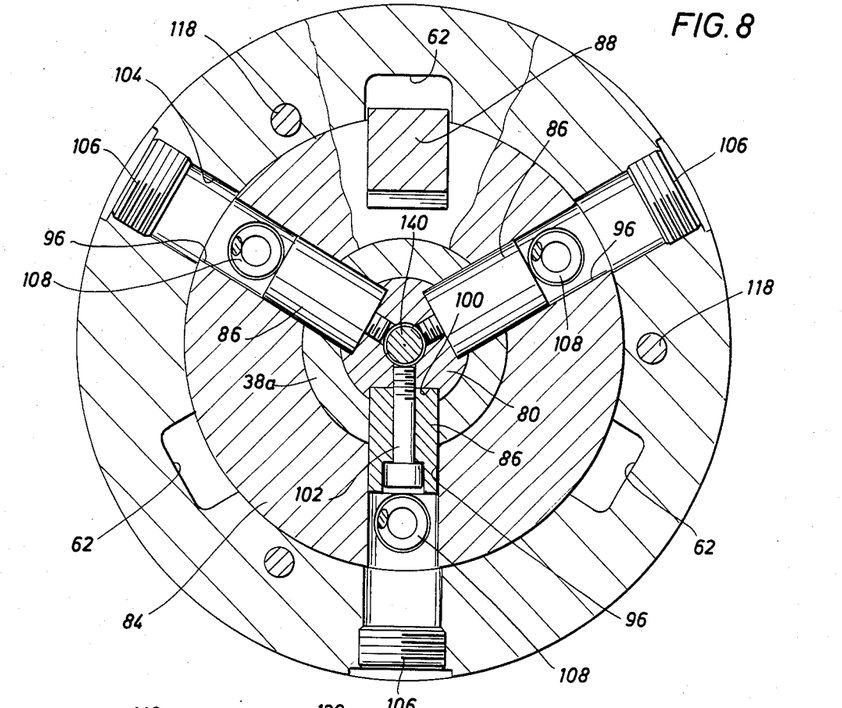
FIG. 8 is a transverse view taken on the lines 8—8 of FIG. 3.

Referring now also to FIGS. 6 and 7, three symmetrically circumferentially spaced jaw raceways 60 extend radially through flange 40b. The raceways 60 extend completely through flange 40b opening radially outwardly through the O.D. of part 40 and radially inwardly through section 53 (although their inner ends are ultimately closed or covered by sleeve 44). Viewed in cross section transverse to its own length, each raceway 60 is T-shaped, having an axially outermost head portion 60a and an axially innermost base portion 60b which opens through the axially inner end face of housing part 40.

Addtionally, three bores 62 are formed in housing part 40, extending longitudinally but spaced radially outwardly from the housing centerline. The bores 62 are further symmetrically circumferentially spaced from one another. Each bore 62 opens through the shoulder formed between sections 51 and 52 and also opens into a respective one of the raceway heads 60a. Bores 62 are generally rectangular in transverse cross section.

As previously mentioned, the first holding means comprises a plurality of chuck jaws 34. More specifically, there are three chuck jaws 34, each in the form of an assembly comprising a master jaw 64 to which a working jaw 66 is adjustably connected. The structure of the jaws 64 and 66, and their relationship to each other and to other adjacent parts of the apparatus are best illustrated in FIGS. 3, 6 and 7. It is noted that FIG. 6 illustrates, in the upper center position, one of the jaw assemblies with all parts in place. In the lower righthand position of FIG. 6, the working jaw has been removed so that the master jaw 64 may be more clearly shown, while in the lower lefthand portion of FIG. 6, the entire jaw assembly has been removed to more clearly illustrate adjacent portions of the apparatus.

Each of the master jaws 64 is slidably mounted in a respective one of the raceways 60. As best shown in FIG. 7, the transverse cross-sectional configuration of the master jaw is T-shaped, to match that of the raceway 60. Thus, the master jaw 64 is permitted to extend and retract radially inwardly and outwardly, but is prevented from falling out of the axial opening at the base 60b of the raceway. However, the master jaw 64 does extend partially axially through the open base portion 60b of the raceway, and it is to this exposed or protruding portion of the master jaw that the respective working jaw 66 is connected.

More specifically, each of the master jaws 64 has a slot 68 extending along its length, i.e. in the radial direction with respect to the apparatus as a whole. Each of these slots is T-shaped in transverse cross section (see FIG. 7) with a head portion 68a and a base portion 68b opening through the exposed axial surface of the master jaw, i.e. opening axially inwardly with respect to the apparatus as a whole. In each of the slots 68, there is a pair of nuts 70. The nuts 70 have a T-shaped configuration for a sliding mating fit in the slot 68 as best shown in FIG. 7. In cross section taken transverse to their own respective axes, the nuts 70 are square in external configuration and round in internal configuration. The internal bore of each nut 70 is threaded or tapped.

Each working jaw 66 is mounted on its respective master jaw 64 by a pair of bolts 72, each of which is threaded into a respective one of the nuts 70 carried in that particular master jaw. When the nuts 72 are tightened, their heads bear against opposed internal shoulders 74 in the working jaw, while the T-heads of nuts 70 are drawn tightly against the opposed shoulders formed between portions 68a and 68b of the slot 68. By loosening bolts 72, the working jaw 66 can be moved radially inwardly or outwardly with respect to its master jaw, and then by retightening the bolts 72, the working jaw can be fixed in a desired position.

As best shown in FIG. 3, the working jaw 66 is axially offset from the master jaw 64, and in addition, depending upon its relative position to the master jaw, its radially innermost gripping surface 66a may also be radially inwardly offset from the master jaw. In this way, the working jaws can be adjusted so that their gripping surfaces 66a will be close to, or possibly in loose contact with, the particular workpiece to be gripped. Then, when the apparatus is placed in the position shown in FIG. 3, wherein the master jaws 64, and the working jaws 66 carried thereby, are extended radially inwardly, the workpiece will be firmly gripped by surfaces 66a.

In order to so extend the jaw assemblies 34, or alternatively, to retract them so as to clear the end of the workpiece for contact by the cutting tool 32, the apparatus is provided with first actuator means, connected to first force transmission means, as well as linking means, interconnecting the first force transmission means and the jaw assemblies 34 to effect both radial and longitudinal movement of the jaw assemblies 34 in response to appropriate manipulations of the actuator means.

The actuator means will be described more fully below. Briefly, the first actuator means is an axial drive type, more specifically, a piston 76 (see FIGS. 1 and 10). For the present, it is merely necessary to note that the first actuator means is effective to produce reciprocating movement of the attached force transmission means comprising two sleeves 78 and 80 connected end-to-end by a nut 82. Sleeve 78 extends through the lathe spindle 16, and sleeve 80 extends from sleeve 78 into sleeve 38a of the base portion 38 of the chuck housing.

The linking means interconnect sleeve 80 with master jaws 64 in such a way that, upon a single, unidirectional stroke of piston 76 and the attached sleeve 80, the master jaws are moved sequentially radially and axially. The linking means include movable housing part 40 and an annular carrier body or ring 84. Carrier ring 84 is slidably mounted for reciprocation in the annular chamber formed between the sleeves 38a and 40a of the chuck housing members. Three lugs 88 integral with ring 84 extend generally longitudinally inwardly therefrom. Each of the lugs 88 passes through a respective one of the rectangular bores 62 in housing member 40 and into a respective mating recess 90 in a respective one of the master jaws 64. Lugs 88 and their mating recesses 90 are generally rectangular in transverse cross section.

As best shown in FIG. 3, the opposed radially innermost and outermost surfaces 88a and 88b, respectively, of the lugs and their recesses are inclined radially outwardly and longitudinally inwardly. Accordingly, lugs 88 and recesses 90, with their inclined surfaces, serve as cam means which, upon longitudinal movement of ring 84, cause jaws 64 to move in the radial direction. More specifically, the inclined lug surfaces 88a and recess surfaces 90a on the radially innermost sides of the lugs and recesses form a first set of cam surfaces which, upon relative movement of ring 84 axially inwardly, cause jaws 64 to move radially inwardly. Similarly, the inclined lug surfaces 88b and opposed recess surfaces 90b on the radially outer sides form a second set of cam surfaces for moving the jaws 64 radially outwardly upon movement of ring 84 axially outwardly with respect to housing part 40 and the jaws mounted thereon.

Axially inward movement of ring 84 with respect to housing part 40 may be limited by abutment of ring 84 with flange portion 40b of housing part 40 and/or by abutment of lugs 88 in the bottoms of recesses 90. However, in use, the working jaws 66 should be adjusted such that they will stop radially inward movement of the jaw assemblies by firm engagement with the workpiece, and thus also stop axially inward movement of ring 84, before lugs 88 "bottom out" in recesses 90 or ring 84 abuts flange portion 40b of housing part 40. Axially outward movement of carrier ring 84 relative to housing part 40 is limited by carrier stop means in the form of a lug 92 integrally carried on the inner wall of sleeve portion 40a of housing part 40 and a mating receptacle 94 in ring 84.

Carrier ring 84 is connected to force transmission member 80 for joint longitudinal movement therewith by the three radial link members 86 comprising further parts of the linking means. Each link member 86 has one end disposed in a radial bore 96 in ring 84 and extends radially inwardly therefrom through an elongate slot 98 in sleeve portion 38a of housing member 38 and thence into a recess 100 in force transmission sleeve 80. To fix the member 86 against radial movement, a bolt 102 is inserted into a counterbored radial bore through member 86, with the head of the bolt abutting the shoulder formed between the large and small diameter portions of that bore, to prevent radially outward movement of member 86. Radially inward movement is prevented by abutment of member 86 with the bottom of recess 100, and bolt 102 is fixed in place by virtue of the fact that its innermost end is threaded into a tapped bore in sleeve 80. The slots 98 permit the necessary longitudinal movement of link members 86 with respect to base part 38 of the chuck housing, and thus, permit longitudinal movement of sleeve 80 and ring 84. Sleeve portion 40a of moving housing part 40 is provided with three radial bores 104 for facilitating installation of link members 86 and bolts 102, and these bores are subsequently closed by plugs 106.

To normally bias ring 84 to a longitudinally outer or retracted position, a set of compression springs 108 are provided. Springs 108 are radially and circumferentially spaced in a symmetrical manner. Each spring 108 may be inserted through a bore 110 in flange portion 40b of housing part 40, into a registering bore 112 in ring 84, and bottomed so that its longitudinally outer end abuts an annular flange 114 at the outer end of bore 112. To abut the opposite end of each spring 108, a plug 116 is threaded into the respective bore 110. For convenience, each of the three longitudinal bores 112 in ring 84 may intersect a respective one of the radial bores 96.

Longitudinally inward movement of housing part 40 with respect to housing part 38 may ultimately be limited by abutment of ring 48 with an opposed shoulder 49 on flange part 38b as shown in FIG. 3. Housing stop means in the form of a stop screw 118 is provided to limit axially outwardly movement of housing part 40 with respect to housing part 38. Screw 118 is threaded into flange 40b, and its end may abut flange 38b to thus limit movement. Screw 118 may be advanced or retracted with respect to housing part 40 by threading movement to vary the extent to which it projects toward flange 38b, and thus, the precise point at which the longitudinally outward movement of housing part 40 is arrested.

Figure 4:
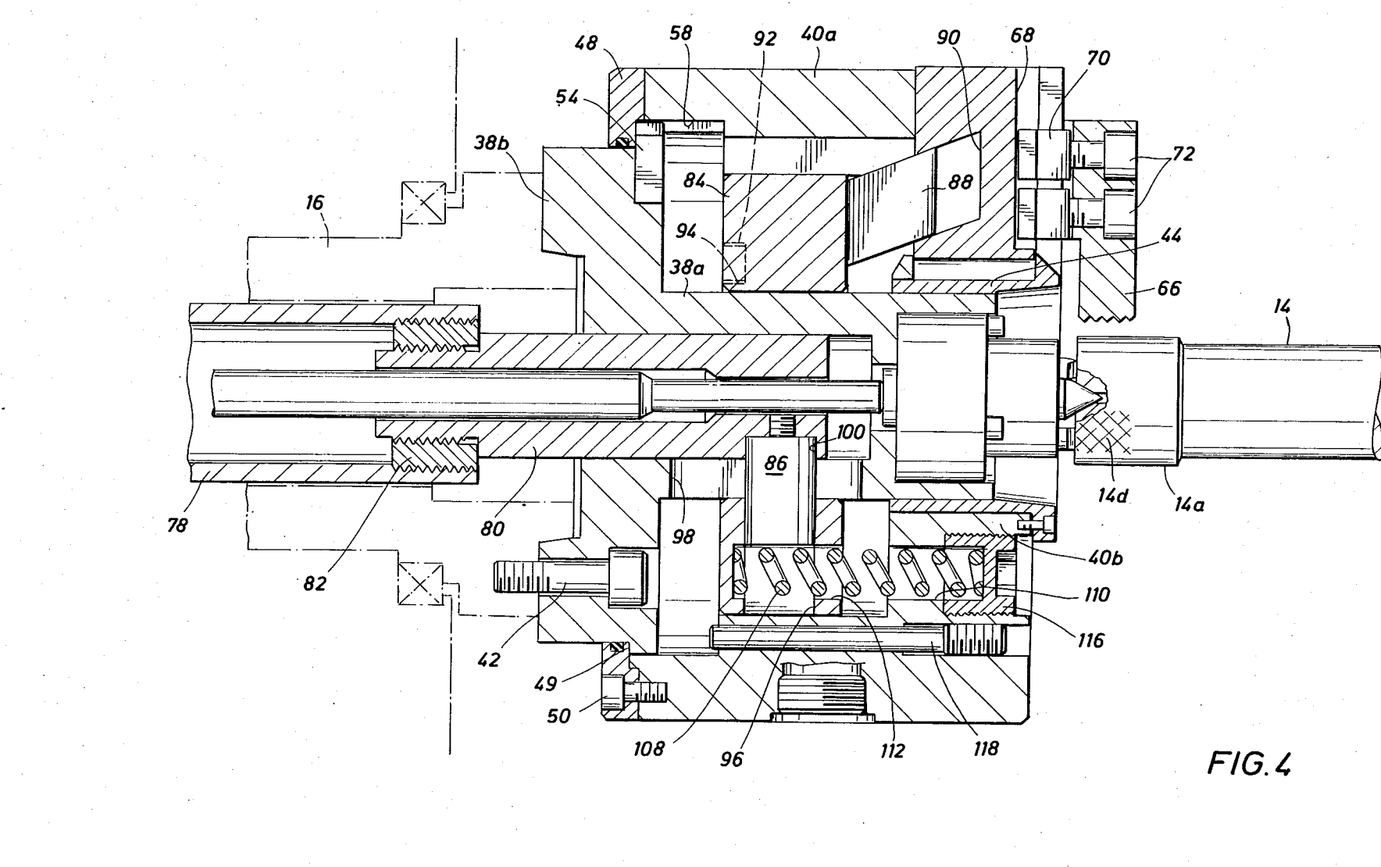
FIG. 4 is a view similar to that of FIG. 3 with the jaws partially retracted, specifically, retracted radially but not longitudinally.
Figure 5:
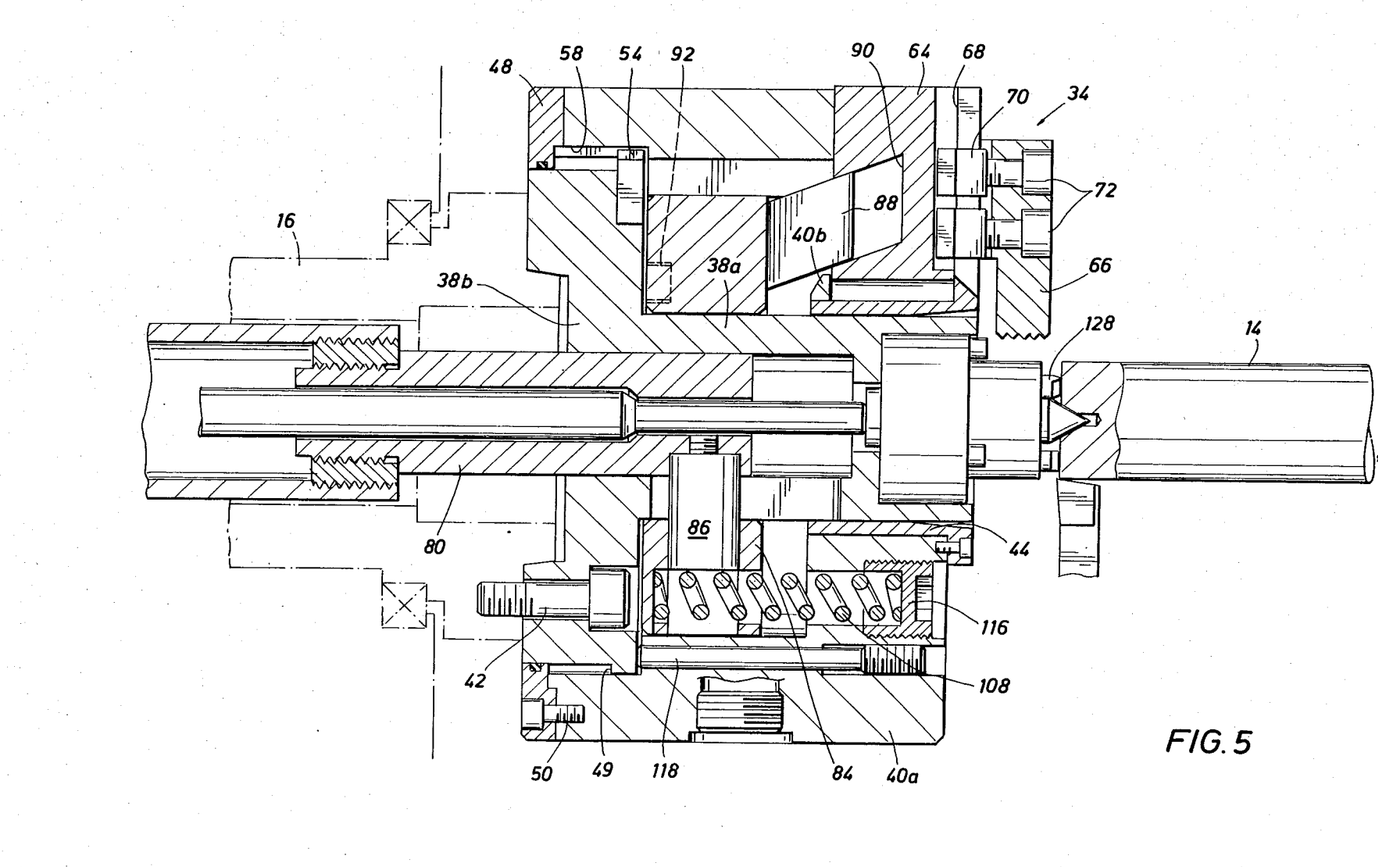
FIG. 5 is a view similar to that of FIG. 3 with the jaws fully retracted.

The movements of the jaw assemblies 34 and their link means can best be understood by comparing FIGS. 3, 4 and 5. Assuming a starting position as shown in FIG. 3, i.e. with the chuck jaws fully extended both longitudinally and radially inwardly to grip the workpiece 14, it can be seen that the lugs 88 are nearly bottomed in their receptacles 90, and that both the carrier stop means 92, 94 and the housing stop means 118, 38b are separated. In order to retract the jaws, first radially and then longitudinally, so as to clear the end of the workpieice 14, the first actuator 76 is reciprocated, in a manner explained more fully below, in a single, longitudinally outward stroke. For purposes of the present discussion, it is sufficient to note that such reciprocation of the piston 76 will cause first force transmission means, 78, 82 and 80 to move longitudinally outwardly, i.e. to the left as viewed in FIGS. 3-5. This axially outward movement is transmitted from sleeve 80 through radial link members 86 to carrier ring 84 and its integral lugs 88.

Since there is less resistance to movement of ring 84 than to movement of housing part 40, ring 84 will begin moving axially outwardly relative to housing part 40. During such movement, the inclined surfaces 88b and 90b of the lugs 88 and receptacles 90 will cam master jaws 64 radially outwardly, carrying working jaws 66 along with them. Such movement will continue until the apparatus reaches the position of FIG. 4, wherein the carrier stop means 92, 94 have become engaged. Springs 108 further ensure that the carrier ring 88 first moves axially outwardly relative to, rather than along with, housing part 40. Referring to FIG. 4, it should be observed that when carrier ring 84 has moved axially outwardly as far as possible with respect to housing part 40, i.e. when such movement is arrested by the stop means 92, 94, lugs 88 are still disposed partially within receptacles 90.

From the position of FIG. 4, sleeve 80 will continue to move axially outwardly, i.e. to the left. This movement will now be transmitted through link members 86 to ring 84, and through stop means 92, 94 to housing part 40, so that the carrier ring 84 and housing part 40, along with all other parts mounted thereon, including jaw assemblies 34, now move axially outwardly with respect to the base part 38 of the housing. This latter portion of the movement is arrested when stop 118 abuts flange portion 38b of housing part 38 as shown in FIG. 5. In that position, the working jaws 66 have cleared not only the end of workpiece 14 but also the working ends of the second or stab-type holding means to be described below.

To reverse the procedure, i.e. to advance the jaws so as to grip the workpiece 14, the procedure is reversed by using the actuator piston 76 to move sleeve 80 axially inwardly, i.e. to the right. As this force is transmitted from sleeve 80 through link members 86 to ring 84, springs 108 ensure that ring 84 and housing part 40 move jointly axially inwardly by resisting relative movement therebetween. Thus, the entire moving part 40 of the housing, including the chuck jaws carried thereby, moves axially inwardly along with ring 84 until ring 48 on housing part 40 abuts the opposed shoulder 49 on housing part 38.

This returns the apparatus to the position of FIG. 4. With further axially inward movement of the housing part 40 no longer possible, continued axially inward movement of ring 84 will urge lugs 88 deeper into receptacles 90 whereby their cam surfaces 88a and 90a cam the master jaws 64 radially inwardly, carrying the working jaws 66 along with them. Since the gripping surfaces 66a of the working jaws are offset both longitudinally and radially inwardly from the master jaws, and more particular having been previously adjusted by means of nuts and bolts 70, 72 to an appropriate position, they will be brought into firm gripping engagement with the side surface of workpiece 14.

Figure 9:
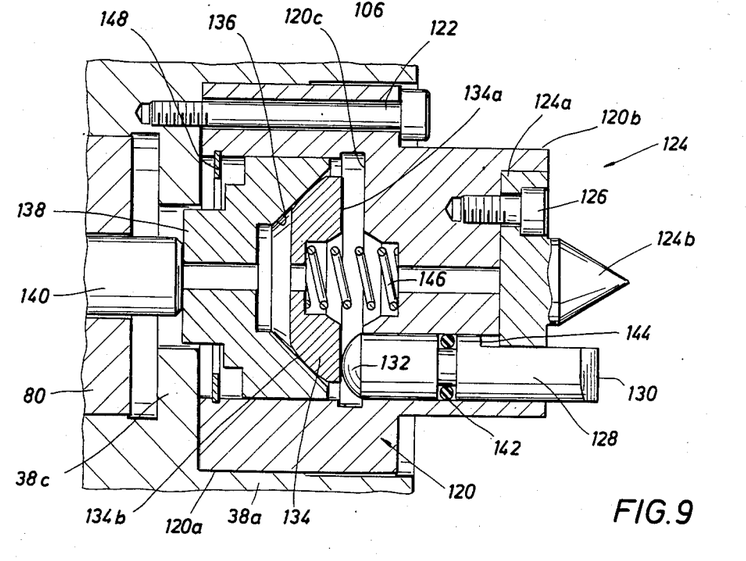
FIG. 9 is an enlarged detailed longitudinal section of the second holding means and related parts.

Referring now to FIGS. 3 and 9, the second holding means 36 will now be described in greater detail. The second holding means is of a type commonly referred to as a "face-driver" and also variously referred to herein as "stab-type" sub-assembly. This sub-assembly comprises a casing member 120 which is fixedly mounted in the axially inner end of sleeve portion 38a of housing part 38. Such axially inner end of sleeve portion 38a has an enlarged inner diameter terminating in an axially facing shoulder defined by an integral annular flange 38c extending radially inwardly from sleeve portion 38a. A large diameter portion of casing 120 fits in the enlarged diameter inner end of sleeve portion 38a, resting against the shoulder formed at flange 38c, and is secured thereto by bolts 122. Bolts 122 extend through holes formed to open through the shoulder formed between large diameter portion 120a of the casing and a smaller diameter portion 120b, which projects axially from sleeve portion 38a and inwardly toward the workpiece.

Fixedly mounted on the protruding end of small diameter portion 120b of the casing 120 is a center 124 having a flange portion 124a which is secured to casing 120 by screws 126, and an integral central conical projection 124b. Projection 124b can engage in the conventional pre-formed centering recess of the workpiece as shown in FIG. 3. Thus, projection 124b initially centers and supports the workpiece 14. However, except in rare cases, the center 124 will not be able to rotatably drive the workpiece 14.

Accordingly, a set of chisel members 128 are slidably mounted in casing 120, and more specifically, in its small diameter axially projecting portion 120b. The inner diameter of casing 120 also has large and small sections, defining therebetween a shoulder 120c facing in the opposite axial direction from projection 124b. Three bores spaced radially from the centerline of the casing 120 and further spaced circumferentially from one another open through shoulder 120c and extend through the small diameter portion of the casing opening through its projecting end face adjacent center 124. The chisel members 128 are each mounted in a respective one of these bores, and as shown in FIG. 6, the flange portion 124a of the center has cut out areas 124c for accommodating the chisel members 128.

Each of the chisel members 128 has a sharpened chisel point or working end 130 which projects axially beyond the casing 120, adjacent center 124b for engagement with the end of the workpiece. The opposite end of each chisel member 128 is rounded as indicated at 132 and projects axially beyond shoulder 120c for engagement by a force distribution member 134 located in the large diameter portion of the central bore of casing 120. The axially inwardly facing end of member 134 is planar and abuts or opposes the rounded ends 132 of the chisel members 128. The axially outwardly facing side 134b of member 134 is spherical and is engaged in frustoconical recess 136 of a bearing member 138, also located generally within the central bore of casing 120. The axially outer end of bearing member 138 is in turn abutted by a rod 140 which serves as a second force transmission means for a second actuator, described below, used to activate and deactivate the stab assembly 36.

The chisel members 128 are slidably reciprocable in their respective bores in casing 120, and are sealed with respect thereto by O-rings 142. The chisels have shoulders 144 opposing the back side of flange portion 124a of center 124 to prevent the chisel members from falling out of the casing 120.

To engage the working ends or points 130 of the chisel members with the axially-facing end surface of the workpiece 14, the second actuator means is used, in a manner described below, to urge rod 140 axially inwardly, i.e. to the right as viewed in the drawings. This urges bearing member 138 axially inwardly, which in turn urges force distribution member 134 axially inwardly, member 134 in turn urging the chisel members 128 axially inwardly into firm holding engagement with the workpiece. Depending upon the material of the workpiece and other factors, the points 130 may be designed to actually dig into the material of the workpiece, or the workpiece may have pre-formed depressions to receive them. In any event, because of the spherical surface 134b resting on frustoconical surface 136, and further due to the fact that the chisel members 138 are three in number, the axial force is evenly distributed.

To deactivate the chisel members 128, rod 140 is urged axially outwardly, i.e. to the left, whereupon a compression spring 146 having its ends located in opposed recesses in surfaces 120c and 134a urges members 134 and 138 axially outwardly relieving the force on chisel members 128. It is specifically noted that it is not necessary for members 128 to undergo a great deal of axial travel, but only that they cease to be forcibly urged against the workpiece. It is further noted that axially inward movement of member 138 is limited by opposed shoulder 120c, while axially outward movement of that member is limited by a snap ring 148 located within casing 120.

Figure 10:
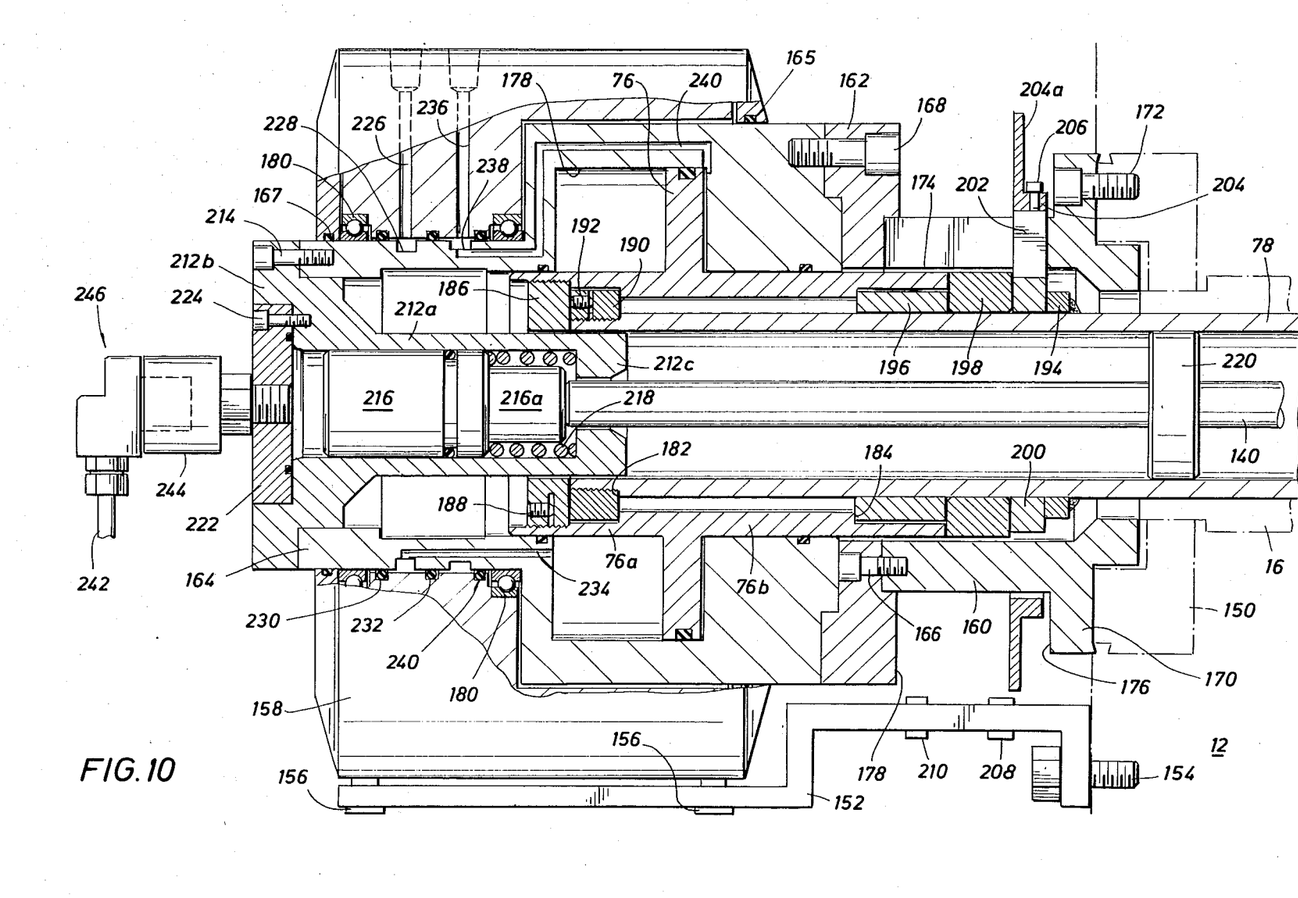
FIG. 10 is a longitudinal sectional view of the actuator end of the chuck assembly with the parts in positions corresponding to those of FIG. 3.
Figure 11:
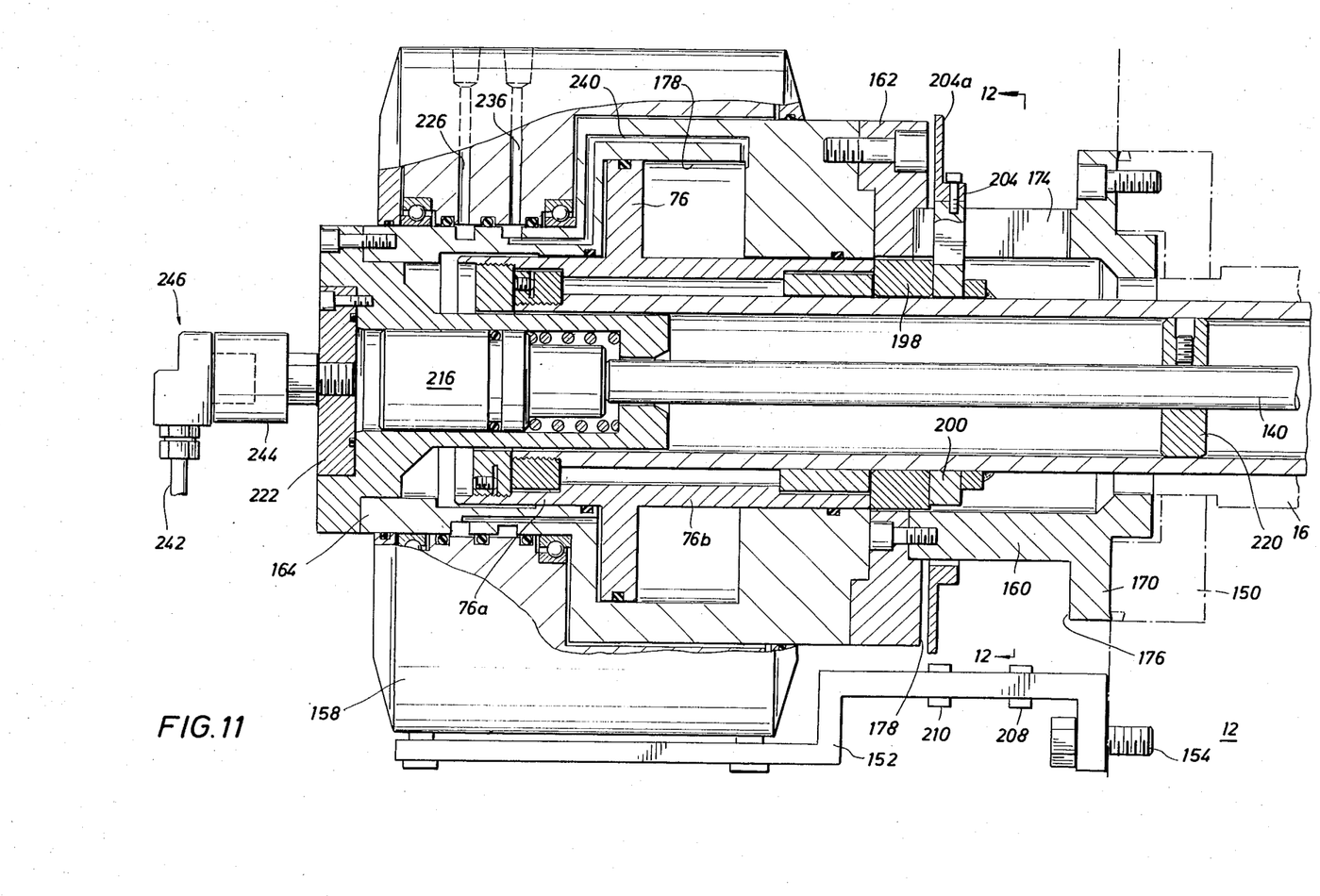
FIG. 11 is a view similar to that of FIG. 10 with the parts in positions corresponding to those of FIG. 5.
Figure 12:
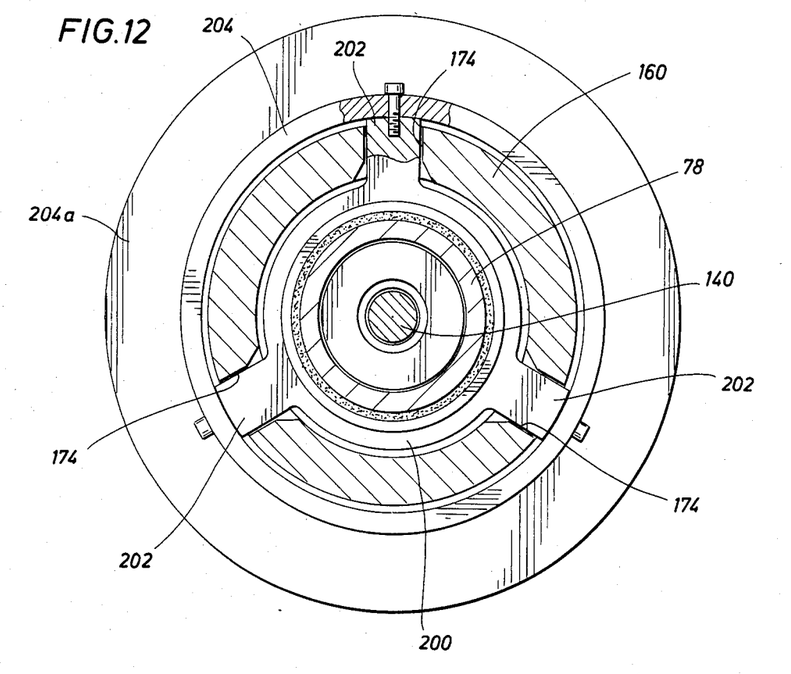
FIG. 12 is a transverse view taken on the line 12—12 of FIG. 11.

Referring now to FIGS. 10, 11 and 12, the actuator means will be described in greater detail. The two actuator means for the respective holding assemblies are incorporated in what might be termed a "package" of concentric piston and cylinder assemblies of a type which is commercially available. This package is mounted on the axially outer side of the lathe headstock by means of a bracket 152 secured to the housing 12 of the headstock in a suitable manner, e.g. by bolts 154. Directly supported on the bracket 152, e.g. secured thereto by bolts 156, is a fluid distribution housing 158. The remainder of the actuator "package" is mounted for rotation generally within fluid distribution housing 158.

This inner or rotary portion of the actuator package comprises a first or outermost cylinder body, which for ease of assembly, is formed of three pieces 160, 162 and 164 connected by screws 166 and 168. The axially innermost piece 160 has, generally adjacent its axially inner end, an annular flange 170, extending radially outwardly therefrom. Flange 170 is configured to mate with a flange 150 integrally connected to spindle 16 in any suitable manner, and the two flanges are connected for joint rotation by bolts 172. Piece 160 has three radial slots 174 extending longitudinally from a point near flange 170 through the opposite end of piece 160. The last mentioned ends of the slots 174 are closed by piece 162. Piece 162 extends radially outwardly beyond the O.D. of the adjacent portion of piece 160 so that, with flange 170, it defines a pair of opposed annular shoulders 176 and 178.

Piece 162 and the immediately adjacent portions of pieces 160 and 164 are of generally similar inner diameter. Distal piece 162, piece 164 has a section 178 of substantially increased inner diameter which serves as the first cylinder for first piston 76, i.e. the cylinder proper of the first actuator means. Axially outwardly of section 178, both inner and outer diameters of piece 164 are decreased. Housing 158 generally surrounds the axially outer and mid portions of piece 164, and has its inner diameter varied to generally match the variations in outer diameter of piece 164. Bearing assemblies 180 support piece 164 for rotation within housing 158. Opposite axial ends of housing 158 are sealed to piece 164 by O-rings 165 and 167.

First piston 76 has an integral sleeve including portions 76a and 76b extending in axially opposite directions from the piston proper. Portions 76a and 76b of the piston sleeve have respective internal counterbores which in turn define respective axially facing shoulders 182 and 184. A ring 186 is threaded into the interior of sleeve portion 76a and fixedly secured thereto by a set screw 188 which engages in a split in ring 186 as shown. Ring 186 in effect forms an integral flange on sleeve portion 76a, and more specifically, opposes shoulder 182. Sandwiched between ring 186 and shoulder 182 is a connecting ring 190, which is similarly threaded and fixed to sleeve 78 by a set screw 192, except that ring 190 extends outwardly, rather than inwardly, from its respective sleeve 78. Thus, sleeve 78 is rigidly connected to the piston sleeve portion 76a for joint movement with piston 76, and along with the piston sleeve and the connecting rings 186 and 190, comprises the force transmission means for transmitting longitudinal forces from piston 76 to the above-described linking means, which in turn are connected to the first holding means or jaw assemblies 34.

A second outwardly extending flange is formed on sleeve 78 by a ring 194 welded thereto. Ring 194 opposes shoulder 184, and sandwiched therebetween are a first spacer sleeve 196 which abuts shoulder 184 and extends to the end of piston sleeve portion 76b, a second spacer ring 198, which abuts the aligned ends of sleeve portion 76b and sleeve 196, and an indicator carrier ring 200, which is sandwiched between sleeve 198 and ring 194. Ring 200 has three tabs 202 extending radially outwardly therefrom, each through a respective one of the slots 174 in cylinder piece 160. An indicator ring 204 is connected to the tabs 202, so that it concentrically surrounds the indicator carrier ring 200, by screws 206. Ring 204 has a narrow flange 204a extending radially outwardly therefrom.

It can be seen that rings 200 and 204 are constrained to move longitudinally with piston 76, slots 174 permitting such movement relative to cylinder 160, 162, 164. Since flange 204a extends outwardly into the open area between shoulders 176 and 178, the operator, by observing the relative position of the flange to the shoulders, can determine the position of piston 76, and thus of the various related parts. In addition, inductive-type switches 208 and 210, of a type well known in the art, can be mounted on bracket 152 to detect the passage of flange 204a and cause a suitable visual and/or audible signal to be emitted to indicate that piston 76 has reached the end of a stroke.

The cylinder for the second actuator means has a sleeve portion 212a, which defines the cylinder proper, an annular flange 212b extending radially outwardly from the axially outer end of sleeve portion 212a, and another annular flange 212c extending radially inwardly from the axially inner end of sleeve portion 212a. Flange 212b is fastened to the axially outer end of first cylinder piece 164 by screws 214 so that sleeve portion 212a projects axially inwardly at least partially into the interior or the first piston body 76, 76a, 76b, and more specifically, into the interior of force transmission sleeve 78 carried thereby.

Slidably mounted in the cylinder formed by sleeve portion 212a is the second actuator piston 216. The axially inner portion 216a of the second piston has a reduced outer diameter. The shoulder formed between this reduced diameter portion and the main body of piston 216 opposes the shoulder formed by flange 212c, and a helical compression spring 218 is disposed between these opposed shoulders and therefore tends to urge piston 216 axially outwardly, i.e. to the left as viewed in the drawing. The axially inner end of reduced diameter portion 216a abuts the axially outer end of rod 140. One or more centralizer assemblies 220 may be carried on rod 140, extending radially outwardly therefrom to bear against the surrounding sleeve 78 and keep the rod 140 centered and supported therein. The axially outer end of cylinder body 212a, 212b, 212c is closed by a cover plate 222 secured by screws 224.

The entire package or assembly illustrated in FIG. 10, with the exception of fluid distribution housing 158, rotates during use of the lathe. Therefore, the means for supplying hydraulic fluid (pneumatic fluid may alternatively be used) must be adapted to permit such rotation. For the first actuator piston 76, which is double acting, a first inlet-outlet passage in the form of a radial bore 226 in housing 158 is provided. The inner end of bore 226 is aligned with an external annular groove 228 in the adjacent cylinder piece 164. Housing 158 is sealed with respect to cylinder piece 164 on axially opposite sides of groove 228 by O-rings 230 and 232. Groove 228 intersects a lengthwise bore 234 which extends through cylinder piece 164 opening into the axially outer side of cylinder chamber 178.

Similarly, there is provided a second inlet-outlet passage in the form of a radial bore 236 through housing 158. The radially inner end of bore 236 is aligned with an external annular groove 238 in cylinder piece 164, and on axially opposite sides of the latter, cylinder piece 164 is sealed with respect to housing 158 by O-rings 232 and 240. Groove 238 communicates with a series of intersecting bores 240 which open into the axially inner end of cylinder chamber 178. It can be seen that, due to the presence of annular grooves 228 and 238, the inlet-outlet bores 226 and 236 are in constant communication with the respective passageways 234 and 240, even though piece 164 rotates relative to housing 158.

Piston 216 is single acting. For this reason, and because it is located centrally of the apparatus, fluid from an inlet line 242 can be supplied to the axially outer portion of cylinder sleeve 212a through a fitting 244 communicating with a central port in plate 222, fitting 244 and line 242 being interconnected by a swivel mechanism 246.

To place the holding assemblies in the positions shown in FIG. 3, i.e. with the chuck jaws 34 fully advanced axially and radially to grip the workpiece 14, and the chisel members 128 disengaged, i.e. not forcibly urged against the end of the workpiece, the actuator means are placed in the modes depicted in FIG. 10. Specifically, bore 236 has been vented, and bore 226 pressurized to cause fluid to flow through passageway 234 and urge piston 76 to the right. The longitudinal force is transmitted through rings 186 and 190 and sleeve 78 to the link members 86 and the carrier 84 to advance the jaw assemblies as described hereinabove. Also, line 242 has been vented, whereby spring 218 has forced piston 218 to the left, relieving force on rod 140 and allowing spring 146 to urge members 134, 138 and 140 to the left, relieving axial force on chisel members 128.

When it is desired to place the holding assemblies in the modes depicted in FIG. 5, the actuator means are placed in the modes of FIG. 11. Line 242 is pressurized whereby piston 216 is urged axially inwardly against the bias of spring 218. This force is transmitted through rod 140 and members 138 and 136 to the chisel members 128. Bore 226 is vented, and bore 236 is pressurized, whereby piston 76 is forced axially outwardly or to the left. This longitudinal force is likewise transmitted by members 186, 190 and 78 to the link means 84, 88 and 40, and thus ultimately to the chuck jaws 34, to retract them radially and longitudinally as described hereinabove.

An exemplary operation which may be performed with the apparatus of the present invention illustrates its advantages in simplifying such a procedure. Referring to FIG. 3, the workpiece 14 is placed in the lathe with the left or holding end 14a supported on center 124, and the chuck jaws 34 are advanced to grip the holding end 14a as shown in FIG. 3. Since the radially grinning chuck jaws 34 are capable of withstanding high torque, the remainder of the workpiece 14 can then be rough-cut, taking off a substantial thickness of material, as shown at 14b in FIG. 3. A finishing cut, removing only small amounts of material, may then be started at the tail end of the workpiece and terminated adjacent the holding end 14a. By actuating piston 216, the chisel members 28 are engaged with the end of the workpiece, as described hereinabove, and then the chuck jaws 34 are radially and axially retracted, all as described hereinabove, and all without removal or turning of the workpiece or removal or addition of parts of the headstock. Then, the holding end is turned as shown in FIG. 5.

Many other modes of use are possible. The turning job described above could be performed by first rough cutting the entire length of the shaft, retracting the chuck jaws and engaging the chisels near the end of the pass, then finishing the entire length in a similar manner. For other types of job it may only be necessary to use one of the two holding means.

It will be appreciated that numerous modifications of the preferred embodiment described above can be made without departing from the spirit of the invention. Accordingly, it is intended that the scope of the invention be limited only by the claims which follow.

What is claimed is:

1. An improved chuck assembly for a lathe apparatus comprising:
    a base structure;
    first holding means for selectively radially gripping the side surface of a workpiece;
    second holding means for selectively forcibly axially engaging an end surface of such workpiece independently of said first holding means; and
    first and second means connecting said first and second holding means respectively to said base structure for movement independently of each other; said first holding means being both radially and axially movable and said second holding means being axially movable,
    actuator means operatively connected to said first and second holding means for effecting such selective independent movement.

2. The apparatus of claim 1 wherein said second holding means is located generally centrally of said first holding means, and said first holding means moves both radially and longitudinally with respect to said base structure.

3. The apparatus of claim 2 further comprising first and second actuator means respectively operatively connected to said first and second holding means for effecting such selective independent movement;
    wherein said first actuator means comprises an axial drive means;
    and said chuck assembly further comprises linking means interconnecting said first holding means and said first actuator means to effect both radial and longitudinal movement of said first holding means upon a single axial stroke of said axial drive means.

4. The apparatus of claim 3 wherein said linking means effects said radial and longitudinal movements sequentially.

5. The apparatus of claim 4 wherein said first holding means comprises a plurality of circumferentially spaced jaw assemblies;
    said base structure comprises a first housing member;
    said linking means comprises a second housing member mounted on said first housing member for relative longitudinal movement and further mounting said jaw assemblies for radial movement relative to said second housing member, a carrier mounted on said first housing member for longitudinal movement relative to both of said housing members, carrier stop means cooperative between said carrier and said second housing member and adapted to limit longitudinal movement of said carrier relative to said second housing member and then permit further longitudinal movement of said carrier and said second housing member jointly relative to said first housing member, and cam means cooperative between said carrier and said jaw assemblies and adapted to effect radial movement of said jaw assemblies relative to said second housing member upon longitudinal movement of said carrier relative to said second housing member.

6. The apparatus of claim 5 wherein said cam means has a first set of cam surfaces operative to move said jaw assemblies radially inwardly upon relative movement of said carrier in a first longitudinal direction.

7. The apparatus of claim 6 wherein said cam means has a second set of cam surfaces operative to move said jaw assemblies radially outwardly upon relative movement of said carrier in a second longitudinal direction opposite said first direction;

and wherein said axial drive means is double acting.

8. The apparatus of claim 7 further comprising means cooperative between said second housing member and said carrier for resiliently biasing said carrier to move in said second direction.

9. The apparatus of claim 7 wherein said carrier stop means is operative to limit movement of said carrier relative to said second housing member in said second direction.

10. The apparatus of claim 9 further comprising adjustable housing stop means for limiting movement of said second housing member relative to said first housing member in said second direction.

11. The apparatus of claim 6 further comprising means cooperative between said second housing member and said carrier for resiliently biasing said carrier to move in said second direction.

12. The apparatus of claim 5 wherein each of said jaw assemblies comprises a master jaw slidably mounted in a respective radial raceway in said second housing member, and a working jaw adapted for gripping such workpiece and adjustably mounted on said master jaw so that said working jaw can be selectively fixed in various radial positions with respect to said master jaw.

13. The apparatus of claim 12 wherein each of said working jaws is mounted on the axially inner side of the respective master jaw;
said master jaws each have a hole in its axially outer side;
said carrier comprises an annular carrier body;
said cam means comprises a plurality of lugs fixedly adjoining said carrier body and each slidably received in a respective one of said holes, said holes and lugs having mating longitudinally and radially inclined cam surfaces.

14. The apparatus of claim 3 wherein said base structure is adapted for mounting on the axially inner working end of a headstock spindle;
said first actuator means is adapted for mounting on the axially outer end of a headstock;
said apparatus further comprising first force transmission means interconnecting said first actuator means and said linking means and adapted to extend through such headstock spindle.

15. The apparatus of claim 14 wherein said second actuator means is associated with said first actuator means for mounting on the axially outer end of such headstock;
said apparatus further comprising second force transmission means interconnecting said second actuator means and said second holding means and adapted to extend through said head stock spindle;
and one of said force transmission means is tubular, and the other of said force transmission means extends coaxially through said one force transmission means.

16. The apparatus of claim 15 wherein said one force transmission means is said first force transmission means, and said other force transmission means is said second force transmission means.

17. The apparatus of claim 16 wherein said second holding means comprises center means having axially innermost working ends for frictionally engaging said axial end of such workpiece, said center means being mounted for longitudinal reciprocating movement with respect to said base structure.

18. The apparatus of claim 17 wherein said base structure has a longitudinally extending sleeve-like portion generally coaxially surrounding the axially inner ends of said force transmission means;
and said apparatus further comprises a center casing member on the axially inner end of said sleeve-like portion and slidably carrying said center means for such reciprocation;
wherein said linking means comprises an annular jaw carrier coaxially surrounding said sleeve-like portion of said base structure;
and said first holding means comprises a plurality of jaw assemblies operably associated with said jaw carrier and disposed outside said sleeve-like portion of said base structure.

19. The apparatus of claim 18 wherein said sleeve-like portion of said base structure has a plurality of circumferentially spaced slots opening radially therethrough;
and said linking means further comprises a plurality of radial link members each extending through a respective one of said slots and interconnecting said jaw carrier with said first force transmission means, said slots being of greater longitudinal dimension than said radial link members to permit longitudinal movement of said jaw carrier relative to said base structure.

20. The apparatus of claim 18 wherein each of said jaw assemblies comprises a master portion disposed radially outwardly of said sleeve-like portion of said housing and a working portion defining a radial gripping surface, said jaws having an innermost position wherein said radial gripping surfaces are disposed axially inwardly of said working ends of said center means and an outermost position wherein said radial gripping surfaces are disposed radially and axially outwardly of said working ends of said center means.

21. The apparatus of claim 16 wherein said first actuator means comprises a first cylinder and an annular first piston assembly within said first cylinder;
and wherein said second actuator means comprises a second cylinder adjacent said first actuator means and a second piston assembly, within said second cylinder, said second piston assembly further having at least a portion which extends through the interior of said first piston assembly.

22. The apparatus of claim 17 wherein said second cylinder is disposed at least partially within said first piston assembly.

23. The apparatus of claim 17 further comprising indicator means associated with said first piston assembly for indicating the longitudinal position of said first piston assembly.

24. The apparatus of claim 23 wherein said indicator means provides a visible indication of such position of said first piston assembly.

25. The apparatus of claim 23 wherein said indicator means comprises a system of inductive switches connected to trigger desired functions when said first piston assembly reaches predetermined positions.

26. The apparatus of claim 3 wherein said second holding means comprises center means having axially innermost working ends frictionally engaging an axial end of such workpiece, said center means mounted for longitudinal reciprocating movement with respect to said base structure.

27. An improved chuck assembly for a lathe apparatus comprising:
a base structure;
a plurality of circumferentially spaced jaw assemblies each mounted on said base structure and having respective radially inwardly facing radial gripping surfaces for gripping the side surface of a workpiece; and
means cooperative between said jaw assemblies and said base structure for independently and sequentially moving said jaw assemblies radially and longitudinally with respect to said base structure, whereby said radial movement effects release of an outer end surface of a workpiece and said longitudinal movement exposes said surface.

28. The apparatus of claim 27 wherein said means for moving said jaw assemblies comprises a jaw carrier mounted for longitudinal movement with respect to said base structure, and wherein said means for moving said jaw assemblies is further operative to sequentially cause such radial and longitudinal movements upon a single longitudinal stroke of said jaw carrier.

29. The apparatus of claim 28 wherein said base structure comprises a first housing member;
said means for moving said jaw assemblies further comprises a second housing member mounted on said first housing member for relative longitudinal movement and further mounting said jaw assemblies for radial movement relative to said second housing member, said carrier being mounted on said first housing member for longitudinal movement relative to both of said housing members, carrier stop means cooperative between said carrier and said second housing member and adapted to limit longitudinal movement of said carrier relative to said second housing member and then permit further longitudinal movement of said carrier and said second housing member jointly relative to said first housing member, and cam means cooperative between said carrier and said jaw assemblies and adapted to effect radial movement of said jaw assemblies relative to said second housing member upon longitudinal movement of said carrier relative to said second housing member.

30. The apparatus of claim 29 wherein said cam means has a first set of cam surfaces operative to move said jaw assemblies radially inwardly upon relative movement of said carrier in a first longitudinal direction.

31. The apparatus of claim 30 wherein said cam means has a second set of cam surfaces operative to move said jaw assemblies radially outwardly upon relative movement of said carrier in a second longitudinal direction opposite to said first direction.

32. The apparatus of claim 31 wherein said carrier stop means is operative to limit relative movement of said carrier with respect to said second housing member in said second direction.

33. The apparatus of claim 32 further comprising adjustable housing stop means cooperative between said housing members for limiting movement of said second housing member relative to said first housing member in said second direction.

34. The apparatus of claim 29 wherein each of said jaw assemblies comprises a master jaw slidably mounted in a respective radial raceway in said second housing member, and a working jaw adapted for gripping said workpiece and adjustably mounted on said master jaw so that said working jaw can be selectively fixed in various radial positions with respect to said master jaw.

35. The apparatus of claim 34 wherein each of said working jaws is mounted on the axially inner side of the respective master jaw;
wherein each of said master jaws has a hole in its axial outer side;
wherein said carrier comprises an annular carrier body;
and wherein said cam means comprises a plurality of lugs fixedly joined to said carrier body and each slidably received in a respective one of said holes, said holes and said lugs having mating longitudinally and radially inclined cam surfaces.

* * * * *

UNITED STATES PATENT AND TRADEMARK OFFICE
CERTIFICATE OF CORRECTION

PATENT NO. : 4,616,538

DATED : October 14, 1986

INVENTOR(S) : Norbert Hessbruggen

It is certified that error appears in the above—identified patent and that said Letters Patent is hereby corrected as shown below:

In column 14, line 24, delete ";" and insert therefor --,--; and in line 27, delete "," and insert therefor --;--.

Signed and Sealed this

Thirtieth Day of December, 1986

Attest:

DONALD J. QUIGG

Attesting Officer     Commissioner of Patents and Trademarks